(12) United States Patent
Liu et al.

(10) Patent No.: US 10,902,192 B2
(45) Date of Patent: Jan. 26, 2021

(54) DYNAMIC DIGITAL DOCUMENT VISUAL AIDS IN A DIGITAL MEDIUM ENVIRONMENT

(71) Applicant: Adobe Inc., San Jose, CA (US)

(72) Inventors: Zhicheng Liu, Seattle, WA (US); Sriram Karthik Badam, Greenbelt, MD (US)

(73) Assignee: Adobe Inc., San Jose, CA (US)

( * ) Notice: Subject to any disclaimer, the term of this patent is extended or adjusted under 35 U.S.C. 154(b) by 23 days.

(21) Appl. No.: 15/818,246

(22) Filed: Nov. 20, 2017

(65) Prior Publication Data
US 2019/0155884 A1 May 23, 2019

(51) Int. Cl.
| | |
|---|---|
| *G06F 40/205* | (2020.01) |
| *G06F 40/169* | (2020.01) |
| *G06F 40/103* | (2020.01) |
| *G06F 40/279* | (2020.01) |
| *G06F 3/0484* | (2013.01) |

(52) U.S. Cl.
CPC .......... *G06F 40/169* (2020.01); *G06F 40/103* (2020.01); *G06F 40/205* (2020.01); *G06F 40/279* (2020.01); *G06F 3/04842* (2013.01)

(58) Field of Classification Search
CPC . G06F 17/241; G06F 17/2705; G06F 3/04842
See application file for complete search history.

(56) References Cited

U.S. PATENT DOCUMENTS

| | | | | |
|---|---|---|---|---|
| 7,418,452 | B2 * | 8/2008 | Maze | G06F 16/367 |
| 7,584,411 | B1 * | 9/2009 | Alexander | G06F 40/20 |
| | | | | 715/202 |
| 7,702,620 | B2 * | 4/2010 | He | G06F 16/313 |
| | | | | 707/999.003 |
| 7,720,799 | B2 * | 5/2010 | Kon | G06Q 30/0601 |
| | | | | 707/715 |
| 7,958,153 | B2 * | 6/2011 | Kon | G06Q 30/0601 |
| | | | | 707/791 |
| 8,200,642 | B2 * | 6/2012 | Maze | G06F 16/93 |
| | | | | 707/694 |
| 8,676,830 | B2 * | 3/2014 | Mukherjee | G06F 16/951 |
| | | | | 707/768 |
| 8,768,960 | B2 * | 7/2014 | Hu | G06Q 30/02 |
| | | | | 707/776 |
| 8,799,260 | B2 * | 8/2014 | Papadimitriou | G06F 16/951 |
| | | | | 707/708 |

(Continued)

*Primary Examiner* — Maikhanh Nguyen
(74) *Attorney, Agent, or Firm* — SBMC

(57) ABSTRACT

Techniques and systems are described for dynamic digital document visual aids in a digital medium environment. For example, a content creation system receives user input indicating a portion of a digital document that is of interest to a user. The content creation system generates keywords based on the indicated portion, and locates data corresponding to the keywords by parsing content associated with the digital document, such as in a hierarchical table. Then, the content creation system generates visual aids based on the indicated portion of the digital document that is of interest to the user and the data. The content creation system may select a subset of visual aids for display based on a determined relevance of the multiple visual aids to the indicated portion and a display size of the digital document.

20 Claims, 8 Drawing Sheets

(56) References Cited

U.S. PATENT DOCUMENTS

| | | | | |
|---|---|---|---|---|
| 10,056,083 B2* | 8/2018 | Negi | ................ | G10L 15/26 |
| 2002/0072895 A1* | 6/2002 | Imanaka | ............. | G06F 17/2715 |
| | | | | 704/9 |
| 2007/0255731 A1* | 11/2007 | Maze | ................ | G06F 16/367 |
| 2008/0010311 A1* | 1/2008 | Kon | ................ | G06Q 30/0601 |
| 2010/0185689 A1* | 7/2010 | Hu | ................ | G06F 40/289 |
| | | | | 707/803 |
| 2010/0223151 A1* | 9/2010 | Kon | ................ | G06Q 30/0601 |
| | | | | 705/26.1 |
| 2010/0325102 A1* | 12/2010 | Maze | ................ | G06F 16/93 |
| | | | | 707/722 |
| 2012/0158693 A1* | 6/2012 | Papadimitriou | ...... | G06F 16/951 |
| | | | | 707/708 |
| 2015/0077419 A1* | 3/2015 | Abuelsaad | ............ | G06F 40/20 |
| | | | | 345/440 |
| 2016/0350950 A1* | 12/2016 | Ritchie | ................ | G06T 11/206 |
| 2017/0109335 A1* | 4/2017 | Lee | ................ | G06K 9/6296 |
| 2018/0108354 A1* | 4/2018 | Negi | ................ | G10L 15/26 |
| 2018/0165724 A1* | 6/2018 | Rakshit | ............ | G06Q 30/0282 |

* cited by examiner

Fig. 3

US 10,902,192 B2

DYNAMIC DIGITAL DOCUMENT VISUAL AIDS IN A DIGITAL MEDIUM ENVIRONMENT

BACKGROUND

Digital documents are becoming an increasingly popular way for users to share information. However, displays associated with common devices to view digital documents, such as desktop computer monitors, laptop computers, and mobile devices, can present difficulties for users with their limited viewing area. In particular, the limited viewing area of many devices often does not afford for display of large portions of text along with relevant visual aids that accompany the text, such as graphs, charts, digital images, and so forth.

Additionally, conventional digital documents often present information in the form of tables apart from text. Reading and comprehending long tables can be cumbersome for users. This problem is worsened by conventional digital documents that place visual aids in an appendix of a digital document, making the visual aids difficult for users to access while reading a pertinent text portion of the digital document. Further, visual aids in conventional digital documents are generated before a user views the completed digital document, and therefore may not be relevant to what different users want to see at any given time. These problems leave users without a comprehensive and cohesive understanding of the content of conventional digital documents.

SUMMARY

Techniques and systems are described for dynamic digital document visual aids in a digital medium environment. For example, a content creation system receives user input indicating a portion of a digital document that is of interest to a user, such as a portion of text or a visual aid. A visual aid accompanies the text and provides information pertaining to the text, such as in a chart, graph, digital image, video, and so forth. The content creation system generates keywords based on the indicated portion, and locates data corresponding to the at least one keyword by parsing content associated with the digital document. For instance, the content creation system locates at least one of the keywords in a hierarchical table associated with the digital document, and then selects data corresponding to the located keywords in the hierarchical table.

Then, the content creation system generates one, or multiple, visual aids based on the indicated portion of the digital document that is of interest to the user and the data. When multiple visual aids are generated, the content creation system may select a subset of visual aids based on a determined relevance of the multiple visual aids to the indicated portion and a display size of the digital document. For instance, the content creation system ranks the multiple visual aids based on the determined relevance, and selects a subset of the highest ranking visual aids for display. In this way, content that is relevant to the user based on the user input is displayed in a format that is appropriate for the display size on which the digital document is displayed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 3 depicts an example implementation showing receipt of user input indicating a portion of a digital document that is of interest to a user and generation of keywords based on the indicated portion for use in creation of dynamic digital document visual aids.

DETAILED DESCRIPTION

Overview

Figure 1:
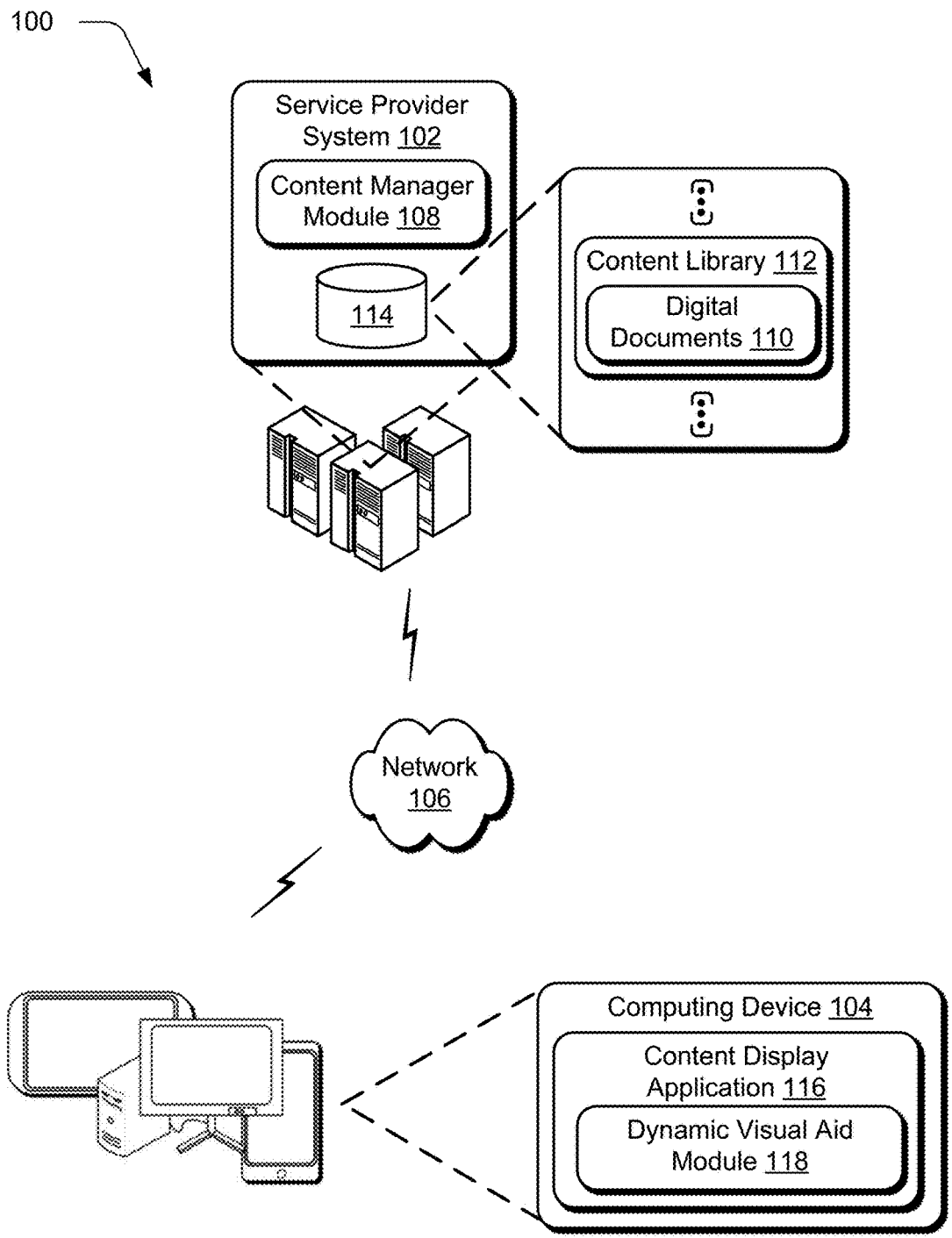
FIG. 1 is an illustration of an environment in an example implementation that is operable to employ techniques for dynamic digital document visual aids as described herein.

Digital documents provide a number of benefits to users who want to disseminate and/or acquire information. Digital documents may contain a variety of data, such as information presented in visual aids alongside text describing a topic of a digital document. Visual aids include any visual supplement to a digital document, such as charts, plots, digital images, video, vector artwork, and so forth. Additionally, digital documents may include supplementary data that accompanies the text and/or the visual aids included in a digital document, which may or may not be displayed as part of the digital documents. This supplementary data often has a complex structure that can be long and hierarchical, e.g., columns of a supplementary data table contain a number of sub-columns and rows of the supplementary data contains a number of sub-rows, which are difficult for users to navigate and comprehend.

For example, UNICEF (United Nations International Children's Emergency Fund) releases situation reports about their activities after disease outbreaks and general trends on specific societal issues that contain tabular information along with a textual narrative to describe the past situation, present improvements, and scope for further development. Many users find it essential that the data in such situation reports to be accessible, but the vast amount of data causes problems when presenting digital documents of the reports. In particular, long and scattered tables that include supplementary data in conventional digital documents require a user to navigate back and forth throughout the digital document to comprehend the data along with a story presented in the text of the digital document. Additionally, users of conventional digital documents must manually develop insights from the tables that include supplementary data based on the text that the user is reading in the digital document. Further, users of conventional digital documents must make new observations from the tables that include the supplementary data on their own, which can be a cumbersome task.

Conventional digital documents provide limited attempts to alleviate the above problems. In one example, conventional digital documents are styled in such a way that supplementary data tables highlight what creators of the digital document feel are important aspects that a reader should see, such as by using bolder text or different fonts. In another example, conventional digital documents place data that creators of the digital document feel are important in tables close to related text and the rest of the supplementary data in an appendix of the digital document. In other examples, conventional digital documents contain visual aids such as maps, line graphs, and bar charts created by a creator of the digital document to further convey information that the creator feels is important. However, these conventional techniques for displaying supplementary data of digital documents only convey a coupling between the textual story and the supplementary data to a limited extent. Further, the display of the supplementary data of digital documents is subject to the document creator's point of view, rather than a user who is consuming the digital document.

Accordingly, techniques and systems are described in which a content creation system generates dynamic digital document visual aids to enhance the reading experience of digital documents. The content creation system, for instance, may be configured to support viewing, creation, and editing of digital documents as part of an application of a computing device in a variety of ways. Examples of which include use as part of an online application (via a subscription-based service system), provide opportunities to purchase a good or service, online storage, or other web service that is accessible via a network. Digital documents may include a variety of different content that may be stored digitally or electronically, e.g., movies, books, documents, games, applications, images, audio files, and so on.

To begin, the content creation system receives user input indicating a portion of a digital document that is of interest to a user. The user input may be a mouse input, keyboard input, voice input, touchscreen or touchpad input, stylus input, remote or game controller input, and so forth. The user input may indicate that the portion is of interest to the user by highlighting text, hovering over or clicking on a portion of a visual aid present in the digital document, viewing the portion of the digital document on a display, reading words of the text of the digital document aloud, or typing words of the text of the digital document, to name a few examples. The content creation system then generates keywords based on the indicated portion of the digital document. The keywords may include all of the words indicated in the portion or a selected subset of the keywords indicated in the portion. For instance, the content creation system may remove certain parts of speech from the portion when selecting keywords, such as pronouns, prepositions, conjunctions, and so forth.

The content creation system locates data corresponding to the keywords by parsing content associated with the digital document. To do so, the content creation system locates the keywords in a hierarchical table associated with the digital document, and selects data corresponding to the keywords in the hierarchical table. The hierarchical table includes supplementary data associated with the digital document, which may be included within the text of the digital document, as an appendix to the digital document, accessed from a remote location from the digital document, and so forth. Locating the keywords in the hierarchical table may first include parsing the hierarchical table using formatting rules that define the hierarchy within the table. Following this, a match between a keyword present in the portion indicated by the user input and the structured content in the hierarchical table may be used to generate visual aids, highlight portions of visual aids, and/or ranking visual aids for display as described below.

The content creation system then generates at least one visual aid based on the indicated portion of the digital document that is of interest to the user and the data selected from the hierarchical table. For example, the content creation system can generate a visual aid such as a chart, graph, or table that is customized to include data from the hierarchical table that is of interest to the user, without including data from the hierarchical table that the user has not indicated an interest in. The content creation system may generate multiple visual aids based on the indicated portion and the selected data, and select a subset of the multiple visual aids for display based on a determined relevance of the multiple visual aids. For instance, the subset of visual aids may be selected by the content creation system for display based on a number of matches between the keywords present in the portion indicated in the user input and the data in the hierarchical table, a number of visual aids that can fit on a display of a device, a weighted sum of a number of matches based on a match type, and so forth. The content creation system then outputs the at least one visual aid for display in a user interface, such as near the portion of the digital document selected by the user for ease of reference.

By utilizing a portion of a digital document that is of interest to the user to generate customized visual aids, users are provided with content in a visual form using a non-modal technique that is relevant to what they are reading or viewing, without having to navigate back and forth between multiple portions of the digital document as required in conventional modal techniques. The techniques described herein reduce the amount of data that a user needs to analyze and comprehend from a digital document by only presenting information in the form of visual aids that is relevant to a portion of interest to the user. Additionally, the techniques described herein adapt visual aids to a display size of the digital document along with the indicated portion of interest, providing advantages over conventional techniques that only display a summary or an entire document content at once. In this way, users reduce the amount of time to view and comprehend digital documents, and overall understanding of digital documents is enhanced.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques for dynamic digital document visual aids as described herein. The illustrated environment 100 includes a service provider system 102 and a computing device 104 that are communicatively coupled, one to another, via network 106. Computing devices that implement the service provider system 102 and the computing device 104 may be configured in a variety of ways.

A computing device, for instance, may be configured as a desktop computer, a laptop computer, a mobile device (e.g., assuming a handheld configuration such as a tablet, digital camera, or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider system 102, and as further described in FIG. 8.

The service provider system 102 is illustrated as including a content manager module 108 that is implemented at least partially in hardware of a computing device. The content manager module 108 is configured to manage online interaction via the network 106 of the computing device 104 with digital documents 110 in a content library 112, which are stored storage 114 of the service provider system 102. As previously described, the digital documents 110 may take a variety of forms, such as any content that may be stored digitally or electronically, e.g., movies, books, documents, games, applications, images, audio files, and so on. Thus, interaction with the digital documents 110 by the computing device 104 via the network 106 may also take a variety of forms, such as selection of a menu item, voice command, gesture, selection of a hyperlink, and so forth.

The computing device 104 is shown as including a content display application 116 which allows users to interact with digital documents, such as by viewing, creating, assembling, editing, compressing, and so forth. Examples of applications that provide functionality which may be included in the content display application 116 include Adobe Acrobat™, Adobe Reader™, and so forth. For example, the content display application 116 accesses digital documents 110 in the content library 112 of the service provider system 102 via the network 106. The content library 112 in this example may be an information source that collects, organizes, and distributes various types of information. Examples of information sources that provide functionality that may be included in the content library 112 include ReliefWeb™, the Congressional Budget Office of the United States, the National Hurricane Center of the United States, public or private libraries, and public or private businesses, although any suitable content library may be used.

The computing device 104 is also shown as including a dynamic visual aid module 118, which may be included as part of the content display application 116. The dynamic visual aid module 118 is configured to receive user inputs indicating a portion of a digital document that is of interest to a user, and dynamically generate visual aids to accompany the digital document based on the indicated portion. For example, the dynamic visual aid module 118 receives user inputs indicating a portion of a digital document 110 from the content library 112 that is of interest to the user. Then, the dynamic visual aid module 118 generates and outputs at least one visual aid that are based on the indicated portion, and based on supplementary data that accompanies the digital document 110. As discussed above, the supplementary data may be included as part of the digital document 110, or may be accessed from another digital document in the content library 112 or another remote source, such as via the network 106.

Figure 2:
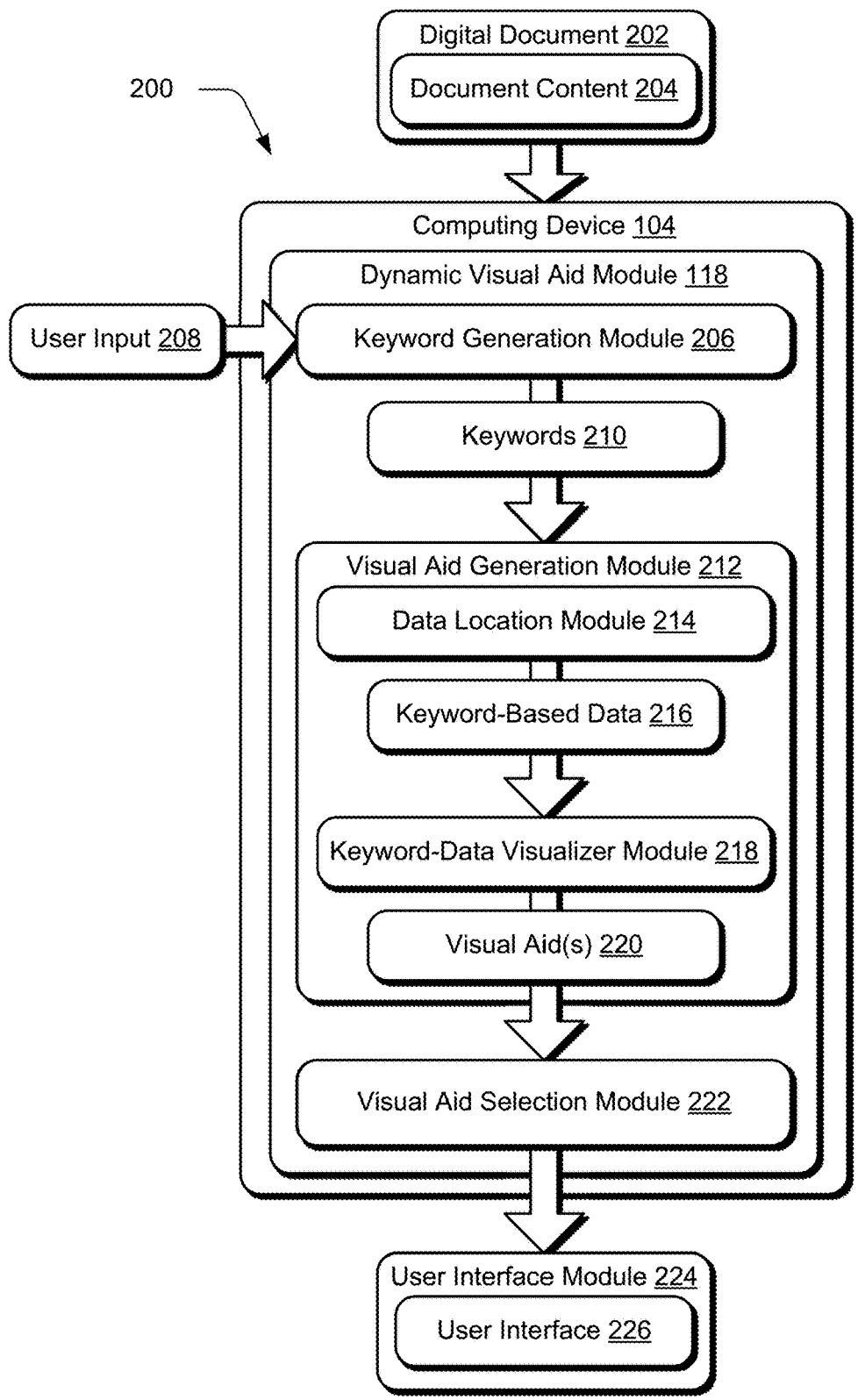
FIG. 2 depicts a system in an example implementation showing operation of a dynamic visual aid module of FIG. 1 in greater detail.

FIG. 2 depicts a system 200 in an example implementation showing operation of the dynamic visual aid module 118 of FIG. 1 in greater detail. To begin this example, the dynamic visual aid module 118 receives a digital document 202, such as from the service provider system 102 as described above. The digital document 202 in this example includes document content 204, which may include text, images, video, vector artwork, tables, charts, graphs, and so forth. The document content 204 may include supplementary document content, which may or may not be accessible by a user of the computing device 104. For instance, the document content 204 may include supplementary data in the form of an appendix which is accessible by a user of the computing device 104 as part of the digital document 202. Alternatively or additionally, the document content 204 may include supplementary data that can be accessed to generate dynamic visual aids from a remote location that is not directly viewable by a user. Remotely accessible supplementary data may be desirable by document creators who want to reduce the file size of their digital documents, while still providing an enhanced experience to viewers of their digital documents.

A keyword generation module 206 of the dynamic visual aid module 118 receives a user input 208 indicating a portion of the digital document 202 that is of interest to a user. The user input 208 may be received in a variety of ways, such as via a mouse input, keyboard input, voice input, touchscreen or touchpad input, stylus input, remote or game controller input, eye tracking input, and so forth. The user input 208 may indicate that the portion is of interest to the user by highlighting text in the digital document 202, hovering over or clicking on a portion of a visual aid present in the digital document, reading words of the text of the digital document aloud, or typing words of the text of the digital document, to name a few examples. Alternatively or additionally, the user input 208 may simply cause a portion of the digital document 202 to be displayed in a user interface, such as by selection of a section header, scrolling through the digital document, and so on.

The keyword generation module 206 then generates keywords 210 based on the portion of the digital document 202 indicated by the user input 208 that is of interest to the user. As discussed above and below, the portion of interest may be indicated by highlighting or otherwise referencing text that is of interest to the user, or simply viewing a portion of the digital document in a user interface, for example. In instances where the indicated portion references text of the digital document 202, the keywords 210 may include all of the words indicated in the portion or a selected subset of the keywords indicated in the portion. For instance, the keyword generation module 206 may remove certain parts of speech from the portion when selecting the keywords 210, such as pronouns, prepositions, conjunctions, and so forth. Other techniques for generating keywords may be used, such as selecting words from the indicated portion that are longer than a threshold number of letters, selecting words from the indicated portion that are nouns and/or verbs, selecting words from the indicated portion from a predetermined list of words, altering words from the indicated portion to increase or decrease specificity (e.g., changing the tense of a word, using a synonym of a word, etc.), and so forth.

A visual aid generation module 212 receives the keywords 210, and uses the keywords to locate data corresponding to the keywords and generate visual aids based on the indicated portion of the digital document that is of interest to the user and the data. For example, a data location module 214 of the visual aid generation module 212 parses supplementary data of the document content 204 associated with the digital document 202 to locate data corresponding to the keywords 210. When the supplementary data includes a hierarchical table, the data location module 214 locates the keywords 210 in the hierarchical table by parsing the rows and/or columns of the hierarchical table for the keywords. In another example, the data location module 214 of the visual aid generation module 202 may first parse the document content 204 of the digital document 202, and generate a hierarchical table from the document content. Then, the data location module 214 locates the keywords 210 in the generated hierarchical table. The rows and/or columns of the hierarchical table can be parsed in any of the described examples based on rules that define the hierarchy within the table, such as rules determined by stylistic or visual affinity, metadata affinity, adjacent dependency, orientation constraints, one-parent constraints, and so forth.

Figure 3:
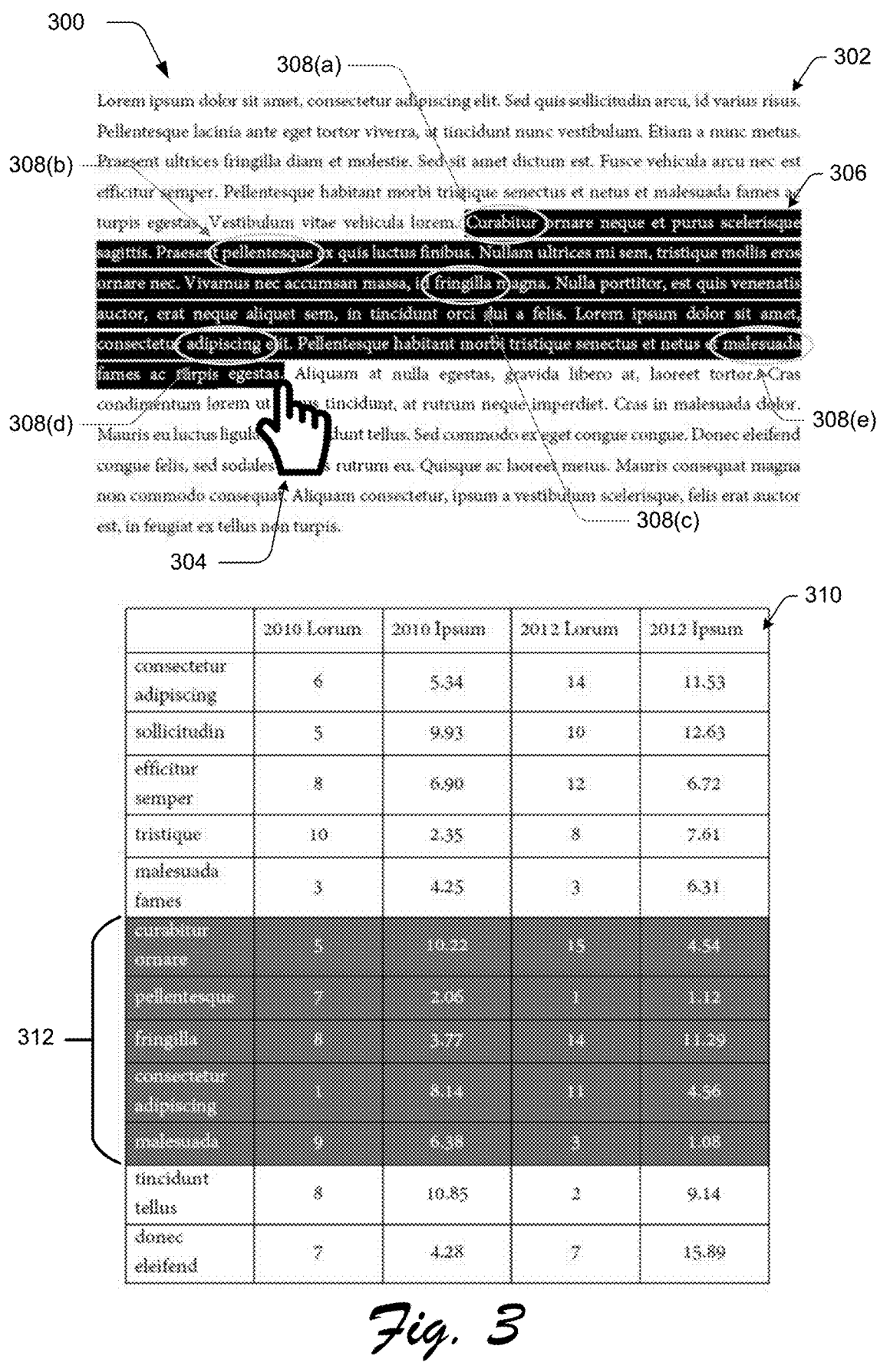

For example, consider FIG. 3, which depicts an example 300 of user input indicating a portion of a digital document that is of interest to a user and generation of keywords based on the indicated portion for use in creation of dynamic digital document visual aids. An excerpt of text 302 of a digital document is shown, which may be the digital document 202 of FIG. 2. The keyword generation module 208 has received a user input from the pointer 304, indicated by the highlighted portion of text 306. The keyword generation module 206 generates keywords 308(a)-(e) by selecting a subset of words from the highlighted portion of text 306. While only five keywords 308(a)-(e) are shown for clarity, any suitable number of keywords may be generated, such as using the keyword generation techniques described above.

The keywords 308(a)-(e) are then used by the data location module 214 to parse supplementary data of the document content to locate data corresponding to the keywords. In this example, the supplementary data is in the form of a hierarchical table 310, which may appear in an appendix of a digital document containing the excerpt of text 302. The highlighted rows 312 of the hierarchical table 310 show where the keywords 308(a)-(e) appear in the hierarchical table. When a keyword generated from the indicated portion of the digital document 202 that is of interest to the user is located in the document content 204, this is referred to herein as a match. In some examples, keywords may still qualify as a match, even if the keywords do not exactly correspond to entries in the document content 204. In this case, the keywords 308(a) and 308(d) do not necessarily provide an exact match to the words appearing in the hierarchical table 310. However, the data location module 214 uses rules that define the content variation in the hierarchy within the table to locate variations of the keywords 308(a)-(e) and data associated with the keywords, examples of which are provided above.

Returning to a discussion of FIG. 2, the data location module 214 generates keyword-based data 216 from the document content 204. The data location module 214 may generate the keyword-based data 216 by selecting data corresponding to the keywords 210 in a hierarchical table included in the document content 204, for instance. Again considering the hierarchical table 310 of FIG. 3, the data location module 214 can select data in the highlighted rows 312 corresponding to the keywords 308(a)-(e) to generate the keyword-based data 216. In further examples of hierarchical tables or other data structures, the rules that define the hierarchies may influence which data to select from the document content 204, such as varied columns and/or rows or individual cells of a table. In some cases, incorrect parsings of the document content 204 may occur, which may be manually fixed by a user by selecting cells in a hierarchical table and/or specifying an intended hierarchy.

A keyword-data visualizer module 218 receives the keyword-based data 216, and generates one or multiple visual aids 220 based on the indicated portion of the digital document 202 that is of interest to the user and the keyword-based data. As discussed above, the visual aid 220 may take the form of a chart, graph, digital image, video, and so forth, and is generated in real-time upon the receipt of the user input 208. The visual aids 220 are generated to include information that the user has indicated an interest in, and therefore data that the user has not indicated as being interested in can be omitted from the visual aids. Additionally, the size, number of visual aids, and location of visual aids may vary depending on a display size of the digital document 202, making the visual aids 220 truly customized to a current user experience.

In cases where multiple visual aids 220 are generated, a visual aid selection module 222 selects a subset of visual aids from the multiple visual aids based on a determined relevance of the multiple visual aids to the indicated portion and a display size of the digital document. The determined relevance of the multiple visual aids prioritizes the visual aids for display such that the visual aids that are most relevant to the portion indicated to be of interest to the user are displayed, while less relevant visual aids are omitted from display based on available display space. The determined relevance may be based on a number of matches between the keywords present in the indicated portion and the data in the hierarchical table, a number of visual aids that can fit on a display of a device, a weighted sum of a number of matches based on a match type, and so forth. The visual aid selection module 222 may also use the determined relevance to highlight or otherwise emphasize portions of generated visual aids to draw attention to particular portions that may be of interest to the user based on the portion indicated by the user input.

For example, if the digital document 202 is being displayed on a display device having a small form factor and only has enough room to display one visual aid along with text, the visual aid selection module 222 may select a visual aid having the highest number of matches for display. In another example, if the digital document 202 is being displayed on a display device that allows for three visual aids along with text, the visual aid selection module 222 may select the three visual aids having a highest sum of a number of matches based on match type for display. A match type, for instance, may weight matches of parts of speech differently, such as placing a higher weight on proper nouns, nouns, verbs, and so forth. Alternatively or additionally, a match type may weight matches based on a predetermined list of prioritized words, an occurrence of words in the digital document, words appearing in titles or headers of the digital document, and so forth.

The visual aid selection module 222 outputs the visual aids 220 for display with the digital document 202, such as to a user interface module 224. The user interface module 224 outputs the visual aids 220 in a user interface 226 of the computing device 104, such as based on a display size of a display of the computing device. The user interface 226 may enable a user of the computing device 104 to provide further user inputs 208 to update or modify the visual aids 220 that are displayed, such as by scrolling to an alternate section of the digital document 202, highlighting another portion of text of the digital document, and/or hovering over a visual aid in the digital document, to name a few examples.

Figure 4:
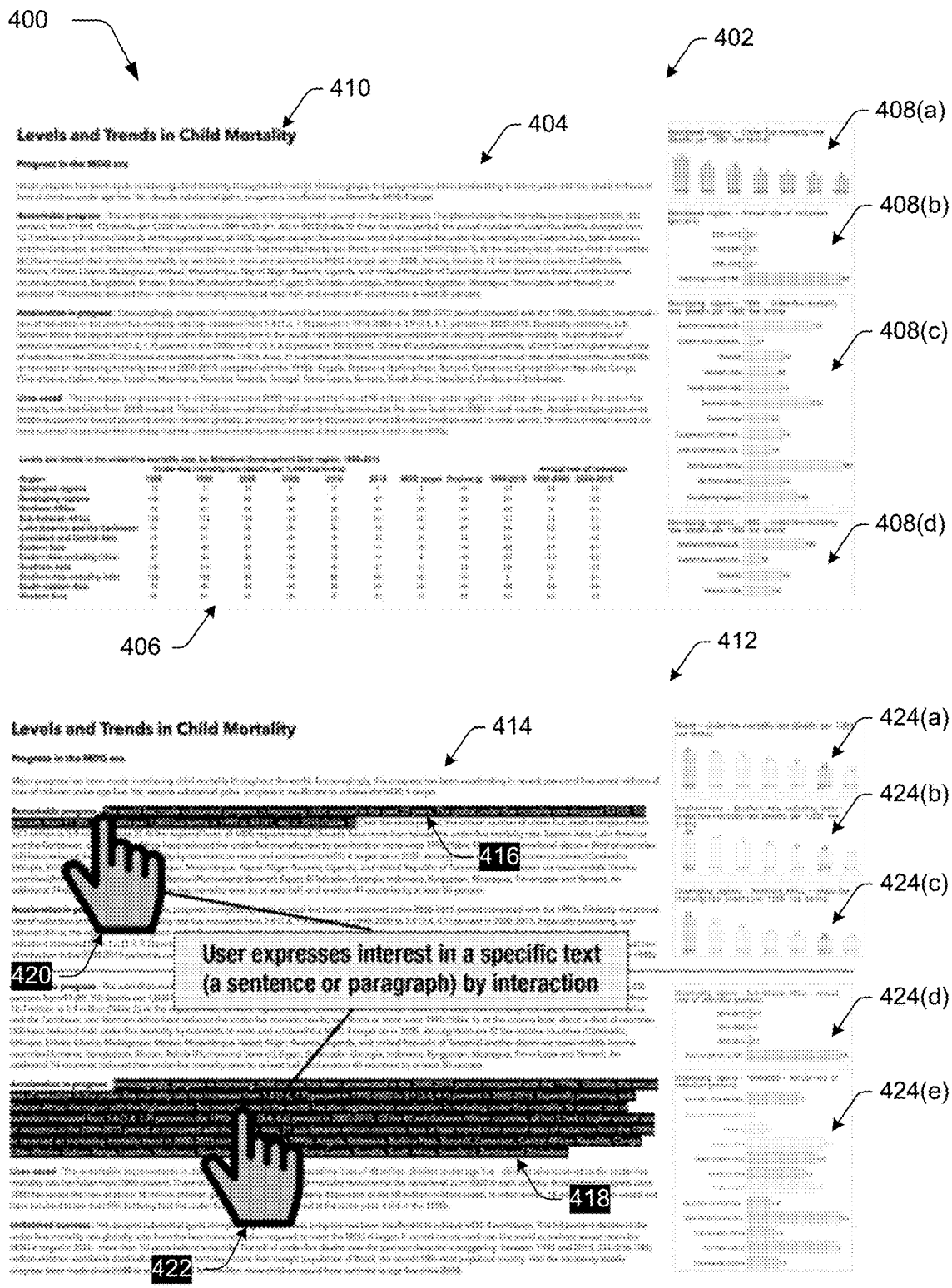
FIG. 4 depicts an example implementation showing creation of dynamic digital document visual aids based on an indicated portion of the digital document that is of interest to the user and data associated with the digital document.

Turning now to FIG. 4, several examples 400 are depicted showing creation of dynamic digital document visual aids based on an indicated portion of the digital document that is of interest to the user and data associated with the digital document. In a first example 402, a text excerpt 404 from a digital document is shown, which may be displayed on a display of a computing device. Additionally, a hierarchical table 406 is shown, which includes document content that accompanies the text excerpt 404. In this example 402, the hierarchical table 406 is also displayed on a display of a computing device with the text excerpt 404, although examples are considered where a hierarchical table is not displayed with text from a digital document.

A number of visual aids 408(a)-(d) are also shown along with the text excerpt 404 and the hierarchical table 406. In this case, the visual aids 408(a)-(d) are based on a user input of selection of the particular text excerpt 404 for display, such as by selection of a header 410 in a table of contents or by scrolling to a location of the text excerpt. Based on the user input, the visual aids 408(a)-(d) are generated and output for display with the text excerpt 404 and the hierarchical table 406. The visual aids 408(a)-(d) are generated using keywords from the text excerpt 404 and data from the hierarchical table 406 as described above, in real time in response to the user input of selection of the text excerpt for display.

In addition to being based on the user input, the visual aids 408(a)-(d) are selected for display based on a display size of the digital document. For instance, a computing device displaying the digital document in this example may have a larger form factor, allowing for four or more visual aids to be displayed at once. Because no additional user input has been received beyond the display of the text excerpt 404, the visual aids 408(a)-(d) may be selected based on a determined relevance to all of the text included in the excerpt. For instance, visual aids may be selected for display that provide a summary of the text excerpt, that relate to key facts presented in the text excerpt, and so forth. The number of visual aids that are presented for display may be altered for different display sizes, such that more or fewer of the generated visual aids are displayed than the visual aids 408(a)-(d) depending upon a display size of the digital document at the time the user input is received.

A second example 412 is also shown, which includes a text excerpt 414 from a digital document, which may also be displayed on a display of a computing device. The second example 412 does not include a hierarchical table, but supplementary data associated with the digital document that includes the text excerpt 414 may be accessed to generate visual aids from an appendix, from a remote location, and so forth. In the second example 412, a user has expressed interest in two portions 416 and 418 of the text excerpt 414, indicated by the user inputs 420 and 422, respectively. The user inputs 420 and 422 may be mouse inputs, keyboard inputs, touch inputs, and/or voice inputs, to name a few examples.

A number of visual aids 424(a)-(e) are also shown along with the text excerpt 414. In this case, the visual aids 424(a)-(e) are based on the user inputs 420 and 422 indicating the portions 416 and 418 are of interest to the user. Based on the user inputs 420 and 422, the visual aids 424(a)-(e) are generated and output for display with the text excerpt 414. The visual aids 424(a)-(e) are generated using keywords from the portions 416 and 418, and supplementary data that accompanies the digital document as described above, in real time in response to receipt of the user inputs 420 and 422.

Additionally, keywords generated from the portions 416 and 418 may be used to highlight data within the visual aids 424(a)-(e). For instance, the user inputs 420 and 422 may select portions 416 and 418 of the digital document that relate to a particular country. The visual aids 424(a)-(e) may then be generated to highlight data points relating to the particular country, while providing context within the visual aids on statistics for other countries that are not highlighted. In this example, the hierarchical data table defines "country" as a parent within the hierarchy for the particular country selected by the user. Highlighting data within the visual aids 424(a)-(e) that are of interest to the user provides an intuitive experience and further reduces comprehension time when users are interacting with a digital document.

In addition to being based on the user inputs 420 and 422, the visual aids 424(a)-(e) are selected for display based on a display size of the digital document. Similar to the above example 402, a computing device displaying the digital document may have a larger form factor, allowing for five or more visual aids to be displayed at once. The keywords generated from the portions 416 and 418 may generate more visual aids than the computing device is configured to display, however. In such a case, the visual aids 424(a)-(e) may be selected based on a determined relevance to the text included in the portions 416 and 418.

For instance, the visual aids 424(a)-(e) may be selected based on a weighted sum of a number of matches based on a match type, where a match is represented by a keyword generated from the portions 416 and 418 and an item of content included in the supplementary data. Additionally, the weighted sum of the number of matches based on match type may be used to order the visual aids 424(a)-(e), such that the most relevant visual aids are displayed from top-down with the digital document, nearest to the portions 416 and 418 selected with the user inputs 420 and 422, and so forth. As discussed above, the number of visual aids that are presented for display may be altered for different display sizes, such that more or fewer of the generated visual aids are displayed than the visual aids 424(a)-(e) depending upon a display size of the digital document at the time the user input is received.

Figure 5:
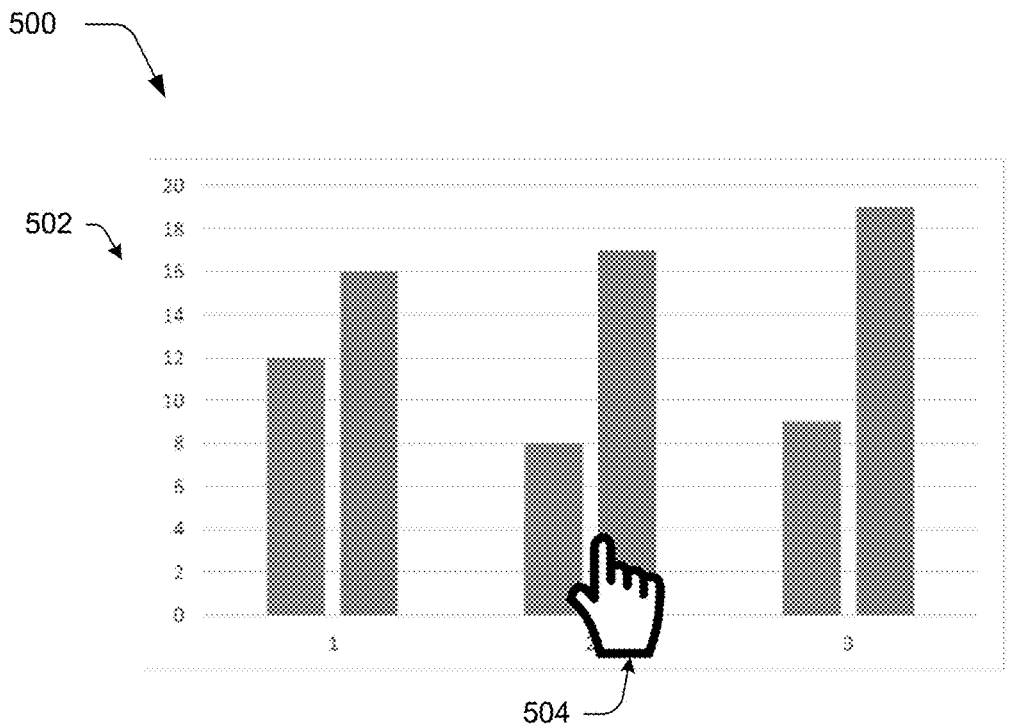
FIG. 5 depicts an example implementation showing receipt of user input indicating a visual aid is of interest to a user, and indicating text in the digital document that is associated with the particular portion of the visual aid.

Turning to FIG. 5, an example 500 is depicted showing receipt of user input indicating a visual aid that is of interest to a user, and indicating text in the digital document that is associated with the particular portion of the visual aid. In other words, a user may indicate interest in content of a digital document other than text, which generates an output in real time providing additional information to the user. For example, a chart 502 is shown, which may be included with content of a digital document when the digital document was originally created. Alternatively or additionally, the chart 502 may be a dynamically generated visual aid using the techniques described herein, such as a visual aid that is generated upon scrolling to a particular section of a digital document by a user.

Within the chart 502, a user input 504 is indicated on a portion of the chart, which may be a mouse input or touch input, to name a few examples. Upon receipt of the user input 504, supplementary data of the digital document is accessed that corresponds to the indicated portion of the chart. For instance, the supplementary data may be accessed using keywords associated with the chart 502 and/or the particular portion of the chart. The keywords may be associated with the chart 502 and/or the particular portion of the chart in a variety of ways, such as using metadata tags for example. Alternatively or additionally, supplementary data may be directly linked to the chart 502, such as by referencing data used to generate a dynamically generated visual aid.

A text excerpt 506 is also shown, which may be displayed with the chart 502 in a user interface as part of the digital document. Upon receipt of the user input 504 on the chart 502, a portion 508 of the text excerpt 506 is highlighted which provides information relating to the portion of the chart indicated by the user input. In this way, users can provide indications of visual aids that they are interested in, and have corresponding information in the text of a digital document highlighted for faster reference. In some examples, the user input 504 on the chart 502 may cause dynamic generation of an additional visual aid such as a chart, plot, or graph, along with or in place of highlighting the portion 508 of the text excerpt 506. Thus, users are provided with even more information on portions of the digital document for which they have expressed interest.

Figure 6:
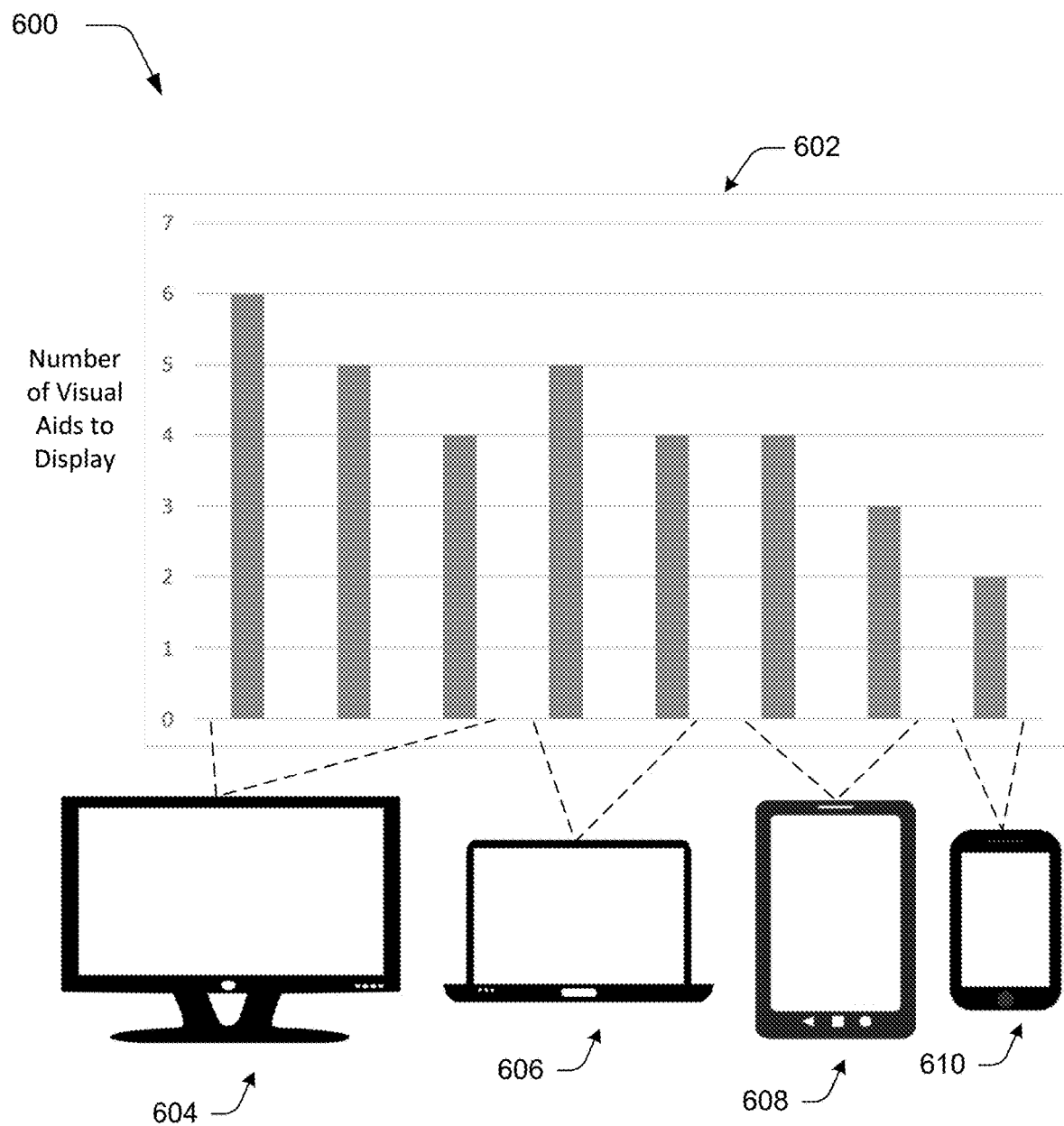
FIG. 6 depicts an example implementation showing sample thresholds for numbers of visual aids to be displayed in different display device sizes.

Next, FIG. 6 depicts an example 600 showing sample thresholds for numbers of visual aids to be displayed in different display device sizes. A chart 602 is shown with sample thresholds for different types of display devices. The chart 602 is meant only as an example to illustrate how a number of visual aids may be selected based upon display device size, and is not intended to be limiting. For instance, the number of displayed visual aids may increase as a user scrolls through generated visual aids in a digital document to view additional dynamically generated visual aids.

In this example, a desktop monitor 604 may be configured to display between four and six visual aids to accompany a digital document, such as when the digital document is in a full-screen mode. The number of visual aids displayed on the desktop monitor 604 may be reduced if a size of the digital document is condensed to be smaller than the full-screen mode, to ensure a comfortable viewing output for a user. Additionally, the number of visual aids displayed may depend on a size of the generated visual aids. For instance, the desktop monitor 604 may allow for six smaller visual aids having less data included in each visual aid, or for four larger visual aids having more data included in each visual aid.

Similar constraints may be place on a laptop computer display 606 to the desktop monitor 602, but with lower thresholds to account for a smaller display size of the laptop computer display 606. For instance, the laptop computer display 606 may be configured to display four or five visual aids to accompany the digital document, such as when the digital document is in a full-screen mode. Again, the number of visual aids displayed on the laptop computer display 606 may be reduced if a size of the digital document is condensed to be smaller than the full-screen mode to ensure a comfortable viewing output for a user. In this example, the laptop computer display 606 may allow for four smaller visual aids having less data included in each visual aid, or for five larger visual aids having more data included in each visual aid.

Additionally, dynamic digital document visual aids may be implemented on displays of mobile devices, as represented by the tablet device 608 and the mobile device 610. To account for smaller form factors of the displays of these devices, a lower threshold of a number of visual aids to display may be used. For instance, the tablet device 608 may be configured to display three or four visual aids to accompany the digital document, while the mobile device 610 may be configured to display two visual aids to accompany the digital document. A variety of techniques may be used to display visual aids on the tablet device 608 and/or the mobile device 610 that have smaller display form factors, such as a pop-up visual aid at the location of a user input on a touchscreen of the tablet device or mobile device.

Example Procedures

The following discussion describes techniques that may be implemented utilizing the previously described systems and devices. Aspects of each of the procedures may be implemented in hardware, firmware, software, or a combination thereof The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
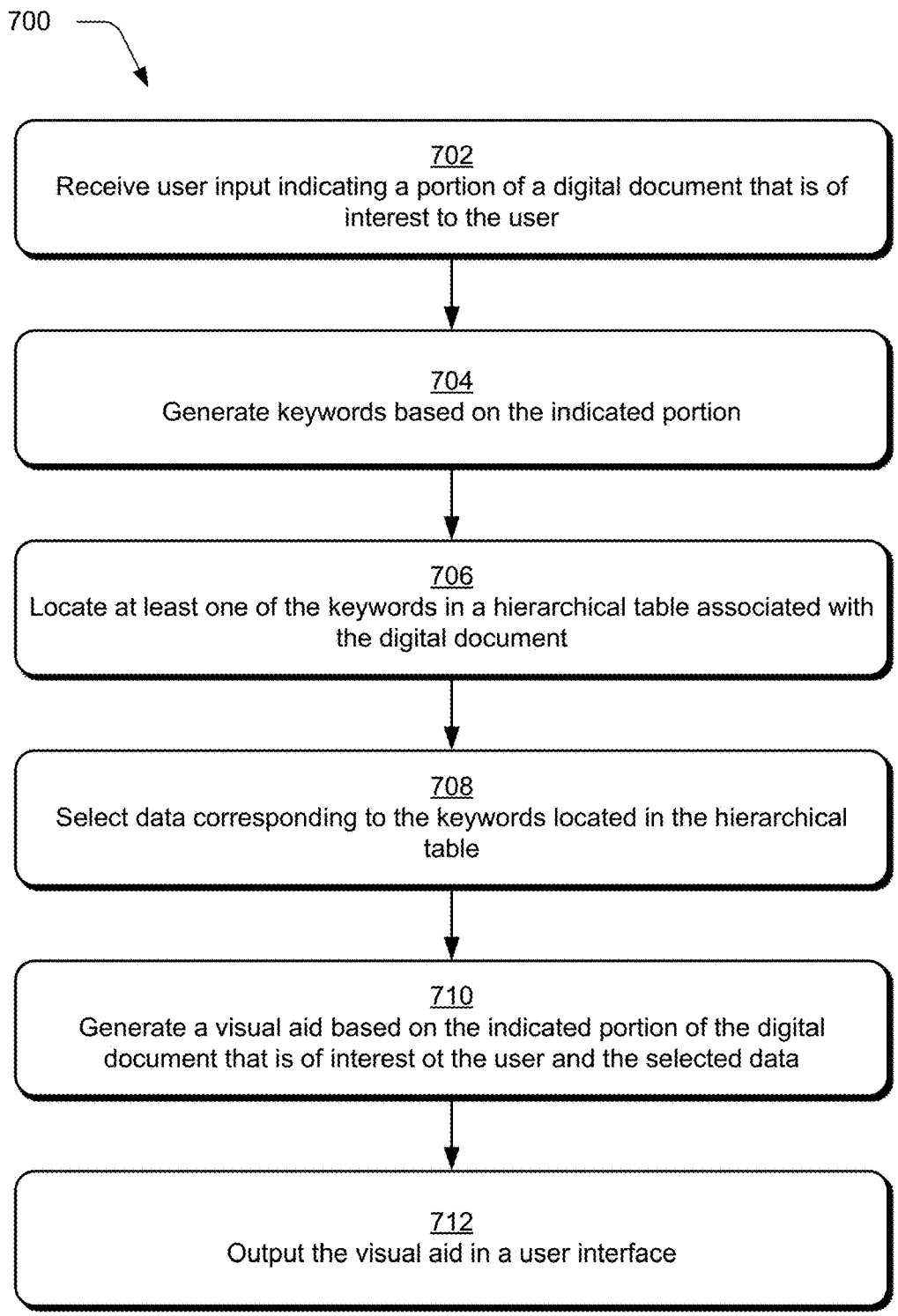
FIG. 7 is a flow diagram depicting a procedure in an example implementation in which dynamic digital document visual aids are generated based on user input indicating a portion of a digital document that is of interest to a user.

FIG. 7 depicts a procedure in an example implementation in which dynamic digital document visual aids are generated based on an indicated portion of a digital document that is of interest to the user. First, a user input is received indicating a portion of a digital document that is of interest to the user (block 702). As discussed above, the user input may be received in a variety of ways, such as via a mouse input, keyboard input, voice input, touchscreen or touchpad input, stylus input, remote or game controller input, eye tracking input and so forth. The user input may indicate that the portion is of interest to the user by selecting or highlighting text in the digital document, hovering over or clicking on a portion of a visual aid present in the digital document, reading words of the text of the digital document aloud, or typing words of the text of the digital document, to name a few examples. Alternatively or additionally, the user input may simply cause a portion of the digital document to be displayed in a user interface, such as by selection of a section header, scrolling through the digital document, and so on.

Next, keywords are generated based on the indicated portion (block 704). When the indicated portion references selected text of the digital document, the generated keywords may include all of the words indicated in the portion or a selected subset of the keywords indicated in the portion. For instance, the keyword generation module 206 may remove certain parts of speech from the portion when selecting the keywords, such as by removing pronouns, prepositions, conjunctions, and so forth. Other techniques for generating keywords may be used, such as selecting words from the indicated portion that are longer than a threshold number of letters, selecting words from the indicated portion that are nouns and/or verbs, selecting words from the indicated portion from a predetermined list of words, altering words from the indicated portion to increase or decrease specificity (e.g., changing the tense of a word, using a synonym of a word, etc.), and so forth.

In some cases, the indicated portion may be a visual aid that is part of the originally created digital document, or a visual aid that is dynamically generated using the techniques described herein. For example, if a user hovers over or clicks on a visual aid, keywords can be generated relating to the visual aid or to a particular portion of the visual aid indicated by the user via the user input. Keywords associated with a visual aid and/or a portion of the visual aid may be generated in a variety of ways, such as using metadata tags for example. Alternatively or additionally, supplementary data may be directly linked to a visual aid and/or a portion of the visual aid as described above.

At least one of the keywords is located in a hierarchical table associated with the digital document (block 706). The hierarchical table may be part of supplementary data associated with the digital document, such as within the text of the digital document, as part of an appendix of the digital document, remotely located from the digital document, and so forth. The data location module 214 may locate the keywords in the hierarchical table by parsing the rows and/or columns of the hierarchical table for the keywords. The rows and/or columns of the hierarchical table can be parsed based on rules that define the hierarchy within the table, such as rules determined by stylistic or visual affinity, metadata affinity, adjacent dependency, orientation constraints, one-parent constraints, and so forth.

Data is then selected corresponding to the located keywords in the hierarchical table (block 708). For example, the data location module 214 generates keyword-based data 216 by selecting data corresponding to the keywords 210 in the hierarchical table. The data location module 214 may select data in the highlighted rows as shown in the example 300 of FIG. 3, where the highlighted rows corresponding to the keywords 308(*a*)-(*e*) are used to generate the keyword-based data 216. In further examples of hierarchical tables or other data structures, the rules that define the hierarchies may influence which data to select from a hierarchical table, such as varied columns and/or rows or individual cells of a table. In some cases, incorrect parsings of the hierarchical table may occur, which may be manually fixed by a user by selecting cells in a hierarchical table and/or specifying an intended hierarchy within the table.

Next, a visual aid is generated based on the indicated portion of the digital document that is of interest to the user and the data (block 710). A visual aid may take the form of a chart, graph, digital image, video, and so forth, and is generated in real-time upon the receipt of the user input. The visual aid is generated to include information that the user has indicated an interest in, and therefore data that the user has not indicated as being interested in can be omitted from the visual aids. Additionally, the size, number of visual aids, and location of visual aids may vary depending on a display size of the digital document on different display devices.

In some cases, multiple visual aids are generated based on the user input and the data. In response, the visual aid selection module 222 selects a subset of visual aids from the multiple visual aids based on a determined relevance of the multiple visual aids to the indicated portion and a display size of the digital document. The determined relevance of the multiple visual aids prioritizes the visual aids for display such that the visual aids that are most relevant to the portion indicated to be of interest to the user are displayed, while less relevant visual aids are omitted from display based on available display space. The determined relevance may be based on a number of matches between the keywords present in the indicated portion and the data in the hierarchical table, a number of visual aids that can fit on a display of a device, a weighted sum of a number of matches based on a match type, and so forth. The visual aid selection module 222 may also highlight or emphasize portions of at least one of the visual aids based on the user input and the data, as discussed above. The visual aid (or multiple visual aids) is then output in a user interface (block 712).

Using the techniques described herein, users are provided with content in a visual form that is relevant to what they are reading or viewing, without having to navigate back and forth between multiple portions of the digital document. Dynamic document visual aids reduce the amount of data that a user needs to analyze and comprehend from a digital document by only presenting information in the form of visual aids that is relevant to a portion of interest to the user. Additionally, the techniques described herein adapt visual aids to a display size of the digital document along with the indicated portion of interest, providing advantages over conventional techniques that only display a summary or an entire document content at once. In this way, users reduce the amount of time to view and comprehend digital documents that are rich in supplementary data, and overall understanding of digital documents is enhanced.

Example System and Device

Figure 8:
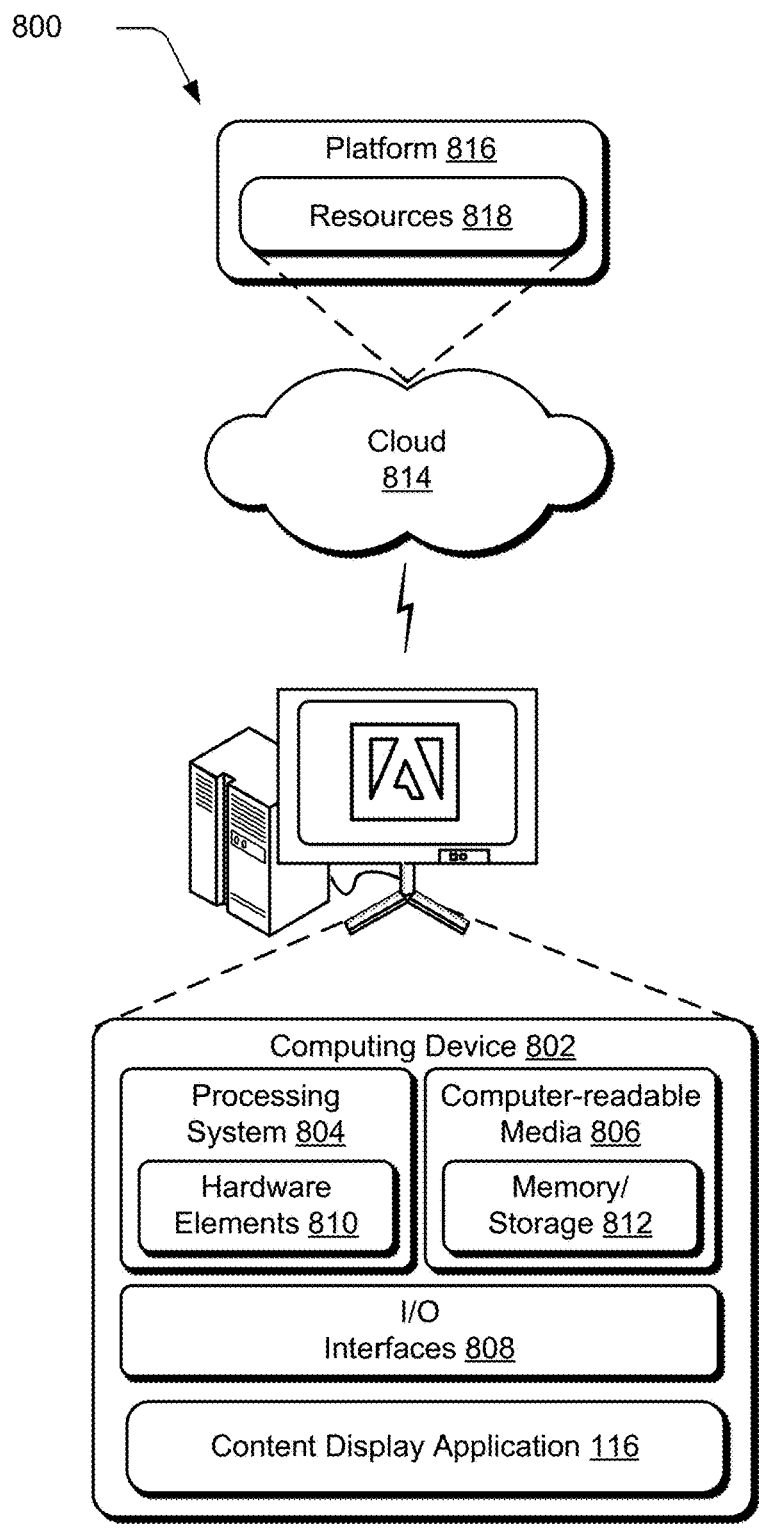
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the content display application 116. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium visual aid environment, a method implemented by at least one computing device, the method comprising:
   receiving, by the at least one computing device, a user input as selecting a portion of text from within a digital document displayed in a user interface;
   generating, by the at least one computing device, at least one keyword based on the portion of text responsive to the user input selecting the portion of text, the at least one keyword generated by selecting a subset of words from the portion of the text of the digital document;
   locating, by the at least one computing device, the at least one keyword in the digital document;
   selecting, by the at least one computing device, data from within the digital document, the data corresponding to the located at least one keyword;
   generating, by the at least one computing device in real time responsive to the user input, at least one visual aid based on the data; and
   outputting, by the at least one computing device, the at least one visual aid in the user interface non-modally and concurrently along with the portion of text from within the digital document in the user interface.

2. The method of claim 1, wherein the at least one visual aid is not included as part of the digital document.

3. The method of claim 1, wherein the locating the at least one keyword includes parsing rows and columns of a hierarchical table for the at least one keyword based on rules that define a hierarchy within the hierarchical table.

4. The method of claim 1, wherein the generating the at least one visual aid further comprises emphasizing a portion of the at least one visual aid based on the portion of the digital document.

5. The method of claim 1, wherein the at least one portion is an additional visual aid included with the digital document, and wherein the generating the visual aid further comprises emphasizing text included in the digital document in the user interface based on one or more keywords associated with the additional visual aid.

6. The method of claim 1, wherein the data is part of an appendix of the digital document.

7. In a digital medium visual aid environment, a system comprising:
   a processing system; and
   a non-transitory computer-readable storage medium having instructions stored thereon that, responsive to execution by the processing system, causes the processing system to perform operations comprising:
      receiving a user input via a user interface, the user input indicating a portion of text within a digital document;
      generating at least one keyword based on the portion of text from within the digital document responsive to the user input, the at least one keyword generated by selecting a subset of words from the portion of the text of the digital document;
      locating data from within the digital document corresponding to the at least one keyword by parsing the digital document; and
      generating in real time responsive to the user input a plurality of visual aids based on the data; and
      selecting which visual aid from the plurality of visual aids is to be output, the selecting based on relevancy of the plurality of visual aids, respectively, to the data and output the selected visual aid in the user interface non-modally along with the portion of text as emphasized within the digital document.

8. The system as described in claim 7, wherein the data is located from within the digital document using a hierarchical table, and further configuring parsing rows and columns of the hierarchical table for the at least one keyword based on rules that define a hierarchy within the hierarchical table.

9. The system as described in claim 7, wherein the relevancy prioritizes the plurality of visual aids for display.

10. The system as described in claim 7, wherein the relevancy is based on a number of matches between the at least one keyword in the portion of the text and the data.

11. The system as described in claim 7, wherein the relevancy is based on a weighted sum of a number of matches based on a match type which weights matches of parts of speech differently.

12. The system as described in claim 7, further comprising generating the at least one visual aid in real-time in response to receiving the user input.

13. The system as described in claim 7, wherein the selecting including selecting the at least one visual aid based at least in part on a display size of the digital document.

14. The system as described in claim 7, wherein the at least one visual aid is not included as part of the digital document.

15. A non-transitory computer-readable storage medium having instructions stored thereon that, responsive to execution by a processing system, causes the processing system to perform operations comprising:
   receiving a user input via a user interface, the user input indicating a portion of text within a digital document;
   generating at least one keyword based on the portion of text from within the digital document responsive to the user input, the at least one keyword generated by selecting a subset of words from the portion of the text of the digital document;
   locating data from within the digital document corresponding to the at least one keyword by parsing the digital document; and
   generating in real time responsive to the user input a plurality of visual aids based on the data; and
   selecting which visual aid from the plurality of visual aids is to be output, the selecting based on relevancy of the plurality of visual aids, respectively, to the data and output the selected visual aid in the user interface non-modally along with the portion of text as emphasized within the digital document.

16. The non-transitory computer-readable storage medium as described in claim 15, wherein the data is located from within the digital document using a hierarchical table.

17. The non-transitory computer-readable storage medium as described in claim 16, the operations further comprising parsing rows and columns of the hierarchical table for the at least one keyword based on rules that define a hierarchy within the hierarchical table.

18. The non-transitory computer-readable storage medium as described in claim 15, wherein the relevancy prioritizes the plurality of visual aids for display.

19. The non-transitory computer-readable storage medium as described in claim 15, wherein the relevancy is based on a number of matches between the at least one keyword in the portion of the text and the data.

20. The non-transitory computer-readable storage medium as described in claim 15, wherein the at least one visual aid is not included as part of the digital document.

* * * * *